United States Patent [19]
Oyachi et al.

[11] Patent Number: 4,752,525
[45] Date of Patent: Jun. 21, 1988

[54] WAVE ABSORBER AND METHOD FOR MAKING SAME

[75] Inventors: Tomio Oyachi, Tokorozawa; Hideo Tajima, Kodaira; Tatsuya Kanayama, Kodaira; Yasuhiro Ino, Kodaira; Minoru Ishiharada, Kodaira, all of Japan

[73] Assignee: Bridgestone Corporation, Tokyo, Japan

[21] Appl. No.: 932,491

[22] Filed: Nov. 20, 1986

[30] Foreign Application Priority Data

Nov. 22, 1985 [JP] Japan ................... 60-263214

[51] Int. Cl.4 .................. B32B 5/16; B32B 9/00; D02G 3/00
[52] U.S. Cl. .................... 428/323; 428/330; 428/364; 428/375; 428/403; 428/404; 428/407; 428/903

[58] Field of Search ............... 428/364, 375, 403, 404, 428/407, 903, 323, 330; 501/134, 135

[56] References Cited

U.S. PATENT DOCUMENTS 4,496,469 1/1985 Morimoto et al. .................. 252/62
4,564,552 1/1986 Adiletta .............................. 428/903

Primary Examiner—Norman Morgenstern
Assistant Examiner—Margaret Burke
Attorney, Agent, or Firm—Birch, Stewart, Kolasch & Birch

[57] ABSTRACT

A wave absorber comprising semiconductive ceramic short fibers having defined diameter, aspect ratio and volume resistivity dispersed in polymer materials. The dispersion is usually formed on a sheet or film base as a layer. A method for making the wave absorber is also described.

9 Claims, No Drawings

WAVE ABSORBER AND METHOD FOR MAKING SAME

BACKGROUND OF THE INVENTION

1. Field of the Invention

This invention relates to a radio wave absorber which is capable of efficiently absorbing radio waves such as, for example, microwaves and radar waves. The invention also relates to a method for making such an absorber.

2. Description of the Prior Art

It is said that the present day is the era of the highly information-oriented society. There is a flood of various information mediums, which are now increasing steadily. No exception is involved in broadcasts and communications utilizing radio waves. More particularly, not only broadcasts and communications such as a conventional FM broadcast, an AM broadcast, a VHF television broadcast, a microwave multiplex radio, a radar communication from ships or fishing boats and the like, but also broadcasts and communications such as a satellite broadcast, an aeronautical radio, a personal radio, a data communication through a satellite and the like spread and increase. At present, substantially all radio waves in all frequency ranges are utilized but several undesirable phenomena take place, including a radio interference, various radio troubles and malfunctions. These phenomena now cause a serious social and environmetal problems. Accordingly, there is a strong demand for a so-called EMC (electro-magnetic compatibility).

To this end, a number of wave absorbing materials have been proposed. For instance, there are known (1) a wave absorber which is composed of a sintered product of a soft ferrite having a large magnetic loss (a real number of the imaginary part $\mu''$ of magnetic permeability, $\mu = \mu' + i\mu''$), (2) a wave absorber sheet which has a soft ferrite powder filled in a rubber or resin, and (3) a wave absorber sheet which has semiconductive carbon with a large dielectric loss (a real number of the imaginary part $\epsilon''$ of dielectric constant, $\epsilon = \epsilon' + i\epsilon''$) including an ohmic loss, filled in a rubber or resin. However, these absorbers have various problems with respect to their properties and applications.

The wave absorber (1) is disadvantageous in that its specific gravity is as heavy as about 5.0. Moreover, since the absorber is made of the sintered product, it is difficult to work such as for cutting, punching, drilling and the like. Although the wave absorber (2) is better in processing than the absorber (1) and has been heretofore applied to parts of bridges because of the advantage in ease of the processing, it has a relatively large specific gravity not less than 3.5 and is unsatisfactory with respect to the radiation absorption property. Accordingly, this absorber has never been used later. The wave radiation absorber (3) is relatively light in weight but a good wave radiation property cannot be obtained unless the dispersion of carbon and the thickness of the sheet can be strictly controlled in a uniform manner. This presents a problem such as a difficulty in controlling the manufacture and the quality of the product, so that a product of a stable quality has not been mass-produced yet and is only attempted to manufacture. In addition, with the wave absorbers (1) through (3), a good wave absorption characteristic is substantially attained only in a narrow range. Among them, the wave absorbers (2) and (3) have such a mechanism as to absorb a radio wave by utilizing a $\lambda/4$ resonance phenomenon while backing with a metal sheet, so that a radio wave of a given frequency is only absorbed. This places a certain limitation on the application of the absorbers. Further, a satisfactory wave absorption property cannot be obtained unless the thickness of the absorber is over 3 mm for the wave absorption (1) and over 1 mm for the absorbers (2) and (3), with an attendant problem that the wave absorbers become thick and heavy.

SUMMARY OF THE INVENTION

It is accordingly an object of the invention to provide a radio wave absorber which is so flexible that it can work easily into a light-weight and thin sheet or film and which exhibits a good wave absorption property over a wide range of frequencies.

It is another object of the invention to provide a method for making a radio wave absorber in which the absorber having such good properties as mentioned above can be relatively easily, stably obtained.

In order to attain the above objects, the present inventors have made intensive studies and, as a result, found that semiconductive ceramic short fibers having a diameter of from 0.1 to 100 micrometers, an aspect ratio of from 10 to 1000 and a volume resistivity of from $10^{-2}$ to $10^2$ ohms.cm are very useful as a wave absorbent by loading them densely as oriented horizontally or along the plane of a base. More particularly, the wave absorber according to the invention comprises 100 parts by weight of a polymer material and from 30 to 300 parts by weight of the absorbent, by which the wave absorber has good wave absorption properties over a wide range of frequencies and is light in weight.

When the polymer material having the capability of film formation is used, there can be obtained a lightweight, thin wave absorber sheet which is flexible and has good workability without a loss of the good wave absorption properties.

We have also found that the wave absorber sheet is obtained easily, efficiently, reliably and stably by dissolving a film-forming polymer material in an organic solvent, uniformly dispersing semiconductive ceramic short fibers in the resultant solution, applying the dispersion onto a film or sheet base such as, for example, a processing paper or woven fabric, orienting the short fibers in the dispersion along the plane of said base by, for example, passing the applied film base between pressure rolls, and evaporating the organic solvent from the dispersion, thereby obtaining a wave absorber.

Accordingly, the present invention provides a wave absorber which comprises 30 to 300 parts by weight of semiconductive ceramic short fibers having a diameter of from 0.1 to 100 micrometers, an aspect ratio of from 10 to 100 and a volume resistivity of from $10^{-2}$ $10^2$ ohms.cm in 100 parts by weight of a polymer material, said short fibers being dispersed uniformly in said polymer material.

The present invention also provides a method for making a wave absorber film or sheet which comprises providing semiconductive ceramic short fibers having a diameter of from 0.1 to 100 micrometers, an aspect ratio of from 10 to 100 and a volume resistivity of from $10^{-2}$ to $10^2$ ohms.cm, adding from 30 to 300 parts by weight of the short fibers to a solution, in an organic solvent, of 100 parts by weight of a film-forming polymer to obtain a uniform dispersion, applying the dispersion onto a film-like base, orienting the short fibers in the dispersion along the plane of said base, and evaporating the organic solvent from the dispersion to form a wave absorber layer on said base.

The wave absorber according to the invention, which comprises, on a base, a dispersion of 30 to 300 parts by weight of semiconductive short fibers having a diameter of from 0.1 to 100 micrometers, an aspect ratio of from 10 to 1000 and a volume resistivity of from $10^{-2}$ to $10^2$ ohms.cm and 100 parts by weight of a polymer material, exhibits a large wave absorptivity over a wide range with respect to waves of X and F frequency bands called SHF, i.e. frequency bands of 3 GHz to 30 GHz. In addition, the wave absorber has a small wave reflectivity and a good wave absorbing power and is so light in weight that its specific gravity is about 1.5. In addition, when the absorber is in the form of a sheet, it has a good surface property and good mechanical strength and is flexible. Such a sheet can be readily worked such as by cutting, punching or lamination or may be imparted with various properties or multi-functions by overcoating or bonding processes. This ensures easy improvements in appearance, durability and weatherability. Accordingly, the wave absorber can stand over a long period under severe outdoor conditions. The wave absorber of the invention is beneficially usable where required as a part of a wide variety of EMC measures including a measure for ghost of VHF and UHF television broadcasts, measures against radio troubles from peripheries of microwave transmitters and receivers, ship and fishing boat radar equipments and satellite broadcast receivers, and measures against imaginary images from bridges and high buildings.

On the other hand, the method of the invention is suitable for mass production of a wave absorber sheet which has good properties and wide utility in various fields and by which it is possible to produce the absorber sheet relatively easily at a high quality.

The above and other objects, features and advantages of the invention will be more apparent from the following description.

DETAILED DESCRIPTION AND EMBODIMENTS OF THE INVENTION

The present invention is characterized in that a wave absorbent used in the wave absorber of the invention is semiconductive ceramic short fibers which have a fiber diameter of from 0.1 to 100 micrometers, an aspect ratio of from 10 to 1000 and a volume resistivity of from $10^{-2}$ to $10^2$ ohms.cm.

When the fiber diameter exceeds 100 micrometers, it is difficult to obtain a wave absorber, especially in the form of a sheet, which has a smooth surface without involving any pinholes, high mechanical strength, high flexibility and good workability. On the other hand, when the fiber diameter is less than 0.1 micrometer or the aspect ratio is less than 10, the wave absorption property is little more than in the case of the use of ceramic powder and a wave absorbent having good wave absorption properties cannot be obtained. If the aspect ratio is over 1000, a good wave absorber in the form of a sheet cannot be formed using such an absorbent. When the volume resistivity is less than $10^{-2}$ ohms.cm or exceeds $10^2$ ohms.cm, good wave absorption properties cannot be expected. The ceramic short fibers outside the scope of the present invention are not suitably used as the wave absorbent in the practice of the invention.

Preferably, the fiber diameter should be in the range of from 0.1 to 10 micrometers, the aspect ratio should be in the range of from 10 to 300, and the volume resistivity should be in the range of, from 0.5 to 20 ohms.cm.

As described above, the wave absorbent used in the present invention is semiconductive ceramic short fibers of specific properties. If other types of wave absorbents such as, for example, metallic fibers, are used, they have so large a wave reflectivity and a specific gravity that the purposes of the invention cannot be attained. Known wave absorbents other than the conductive ceramic short fibers include, for example, ferrite powders, semiconductive carbon and the like. However, these absorbents have the drawbacks discussed hereinbefore.

The semiconductive ceramic short fibers used as the wave absorbent according to the invention may be those which have semiconductivity to an extent sufficient to satisfy the requirements defined before, or may be those which are obtained by treating non-conductive ceramic short fibers by suitable surface treating processes such as a reduction process or by coating such fibers with suitable coatings such as conductive metal oxides to impart a suitable degree of semiconductivity to the short fibers. The reduction process may be conducted by the process which comprises adding carbon powder to the semiconductive short fibers such as alkali titanate short fibers to heat treat them at 500° to 1300° C. in an atmospher under reducing or inert gas or at 500° to 1000° C. in an atmospher under ammonia gas.

The semiconductive ceramic short fibers suitable for the purpose of the invention include, for example, short fibers of alkali titanates of the following general formula (I)

$$M_2O(TiO_2)_n \qquad (I)$$

in which M represents an alkali metal and n is an integer of from 2 to 12. The short fibers of the alkali titanate have a reinforcing effect and good properties such as wear resistance, surface smoothness and dimensional stability.

These alkali titanate short fibers may be those which are produced according to known processes as described in Japanese Patent Publication No. 42-27264 and Japanese Laid-open Patent Application No. 51-49924. Processes of rendering alkali titanate short fibers conductive on the surface are, for example, described in Japanese Laid-open Patent Application Nos. 57-103204, 58-135129, 58-135130 and 59-6234. The short fibers which have been surface-treated to have a controlled conductivity are preferably used as the wave absorbent according to the invention.

In the preparation of the wave absorber according to the present invention, the semiconductive ceramic short fibers are formulated by dispersion in polymer materials. The wave absorbent is used in an amount of from 30 to 300 parts by weight per 100 parts by weight of a polymer material. Preferably, the amount is from 50 to 200 parts by weight. If the amount of wave absorbent is less than 30 parts by weight, the wave absorption properties are poor. Over 300 parts by weight, the wave reflectivity increases with a considerable lowering of mechanical strength, thus being unsuitable for the purpose of the invention.

The type of polymer material in which the wave absorbent is dispersed is not critical and the wave absorber may be formed in various forms, depending on the purpose. If the wave absorber is formed as a sheet, the polymer material should preferably have the capability of film formation.

The polymer materials having the capability of film formation are not critical. Preferable examples of such materials include natural rubber, synthetic rubbers, polyolefin resins, alkyd resins, acrylic resins, vinyl resins, epoxy resins, urethane resins, polyamide resins, polyester resins and mixtures thereof. These polymer materials are selected depending on mechanical properties necessary for the wave absorber sheet. Aside from the mechanical properties, other properties such as flame resistance may be taken into account depending on the purpose and application of the wave absorber sheet. For instance, if flexibility and toughness are required, urethane resins are preferably used. If a flame resistance is required, soft vinyl chloride resins are preferred. The thickness of the wave absorber sheet, which is a layer of a composition having the capability of wave absorption and composed of the wave absorbent and a film-forming polymer material is not critical, but is generally in the range of from 10 to 500 micrometers, preferably from 50 to 150 micrometers, within which the absorption properties are not lost and the wave absorber sheet is light in weight and thin.

Aside from the wave absorbent and the polymer material, various additives such as fillers, reinforcing materials, extenders, softeners, plasticizers, antioxidants, smoothing agents, pigments, curing agents, crosslinking agents, curing assistants, promotors for crosslinkage and the like may be added.

The wave absorber of the invention may be combined with other materials. For instance, when the absorber is formed as a sheet composed of a wave absorbent, a film-forming polymer and, if necessary, other additives, the single sheet may be used as it is. In order to improve the mechanical strength, durability and appearance such as by coloration, the single film may be overcoated at least one side thereof with a resin such as polyurethane or bonded or laminated with other types of films or sheets in which the semiconductive ceramic short fibers are not dispersed.

These composite wave absorption sheets may be obtained by applying, on the single wave absorber sheet, a solution or dispersion in a solvent of a composition which comprises an ingredient having improving or reinforcing effects, a film-forming polymer material and, if necessary, various additives. The solution or dispersion may be overcoated or applied by coating, dipping, spraying or the like. Alternatively, if the above composition is a rubber composition, it may be bonded to the wave absorber sheet by heating under pressure for vulcanization. Especially, when an organic or inorganic woven or non-woven fabric is bonded to the wave absorber sheet by means of a bonding agent or an adhesive, the resultant composite wave absorption sheet has very high mechanical strength without a loss of flexibility and, thus, has a great practical merit.

In order to ensure good wave absorption properties, the semiconductive ceramic short fibers should be oriented along the plane of a base. This orientation is achieved according to the method of the invention.

In the method, semiconductive ceramic short fibers serving as the wave absorbent are first added to a solution of a film-forming polymer material in an organic solvent in such a way that the fibers are uniformly dispersed in the solution so as to render the dispersion fluid and sufficient to allow the orientation of the wave absorbent along the plane. If necessary, other additives such as fillers may be added to the dispersion. For imparting to the dispersion fluidity sufficient to permit the absorbent to the arranged or oriented along the plane, it is preferred that the film-forming polymer material is added in an amount of from 20 to 40 parts by weight per 100 parts of the organic solvent.

The dispersion is subsequently applied onto a film base according to the method of the invention. The film base may be organic or inorganic woven or non-woven fabrics, processing paper, Mylar films and the like but all films or sheets on which the dispersion is applicable may be used. The application methods may be a wire bar method, a blade method and the like. The application conditions including an application speed, temperature and humidity at the time of the application and the like are properly controlled depending on the viscosity of the dispersion and the thickness of the wave absorber sheet.

In a subsequent step, the ceramic short fibers in the dispersion which has been applied onto the film base is oriented along the plane of the film base. This orientation may be effected by a rubbing method in which the applied film base is rubbed with a cotton cloth in one direction or a method in which the film base is passed between pressure rollers. The pressure roll method is more convenient for the present invention because the semiconductive ceramic short fibers can be oriented relatively easily and efficiently and this method has better mass productivity. If the pressure roll method is adopted, the pressure roller should be adjusted so that the ceramic short fibers in the dispersion on the film base not only can be oriented as desired, but also the wave absorber sheet is controlled to have a given thickness, which is preferably in the range of from 10 to 500 micrometers.

Thereafter, the organic solvent is completely removed by evaporation from the dispersion layer on the film base. The evaporation of the organic solvent may be effected by drying under reduced pressure by application of heat and an air blast. These drying conditions may vary depending on the viscosity of the dispersion, the amount of the organic solvent in the dispersion, and the width and length of the sheet. The drying by passing the sheet through a hot drying chamber with or without application of an air blast is advantageous for the industrial manufacture of the wave absorber sheet.

It will be noted that the organic solvent used to prepare the dispersion is selected from the standpoint of compatibility and workability but depending on the type of film-forming polymer material. When, for example, vinyl chloride resin or urethane resin is used as the film-forming polymer material, a mixed solvent mainly composed of dimethylformamide (DMF) and tetrahydrofuran (THF) is conveniently used in view of film formation and workability.

The present invention is more particularly described by way of examples and comparative examples. These examples should not be construed as limiting the present invention.

Various measuring methods used in the examples and comparative examples are described.

A. Volume resistivity of wave absorbent

A wave absorbent was shaped in the form of a tablet having a diameter of 20 mm and a thickness of 5 mm by the use of a tablet molding machine at room temperature under a pressure of 100 kg/cm$^2$. The tablet sample was subjected to measurement of an electric resistance along the thickness thereof by means of a digital multimeter VP-2661B (manufactured by Matsushita Communications Ind. Co., Ltd.). The volume resistivity was calculated from the measurements.

B. Wave absorbing power of wave absorber sheet

A wave absorber sheet having a rectangular form of 10×22 mm was inserted into a coaxial waveguide converter (HP-X281C, by Hewlett-Packard Inc.) and was irradiated with waves of four frequencies of 8, 10, 12 and 14 GHz at an output of 1 mW by the use of a sweeper (HP-8350B, by Hewlett Packard Inc.). The intensities of a transmitted wave and a reflected wave of each wave were measured. The measured electric signal was inputted into a network analyzer (HP-8756A, produced by Hewlett Packard Inc.) and analyzed, from which a wave transmission factor, a wave reflectivity and a wave absorptivity were calculated.

EXAMPLES 1–9 and COMPARATIVE EXAMPLES 1–6.

Wave absorbents indicated in Table 1 and vinyl chloride resin (plasticizer-free vinyl chloride copolymer resin, by Sekisui Chem. Co., Ltd.) used as a film-forming polymer material were formulated in amounts indicated in Table 2. The vinyl chloride resin was first dissolved in a mixed solvent of tetrahydrofuran (THF) and dimethylformamide (DMF) in a mixing ratio by weight of 1:1, to which each wave absorbent was added, followed by sufficient kneading to obtain a dispersion. Thereafter, the dispersion was applied onto a processing paper, which was passed between pressure rolls which had been adjusted at a given clearance so that a predetermined sheet thickness was obtained. Subsequently, the paper was passed through a drying chamber to evaporate the solvent, thereby obtaining a wave absorber sheet having a thickness indicated in Table 2.

The wave absorber sheets obtained in Examples 1–9 and Comparative Examples 1–6 were subjected to measurement of the radio wave characteristics, i.e. a transmission factor (Tr), a reflectivity (Rf) and an absorptivity (Abs) of a wave having frequencies of from 8 to 14 GHz.

The test results are also shown in Table 2.

TABLE 1

| Kind of wave absorbent | Kind of material | Fiber size ($\mu$m) | Aspect ratio | Volume resistivity (ohms · cm) | |
|---|---|---|---|---|---|
| $a_1$ | Short fibers of potassium titanate* | 0.2–0.5 | 20–100 | $10^{1.5}$ | Example |
| $a_2$ | subjected to surface conduction | | | $10^0$ | |
| $a_3$ | treatment by a reduction method** | | | $10^{-1.5}$ | |
| $a_4$ | Short fibers of potassium titanate* subjected to conduction treatment by reduction** | 1–5 | 50–600 | $10^0$ | |
| $a_5$ | Short fibers of potassium titanate* subjected to condition treatment by coating with conductive metal oxides | 0.2–0.5 | 20–100 | $10^1$ | |
| $b_1$ | Same as in $a_1$–$a_3$ | 0.2–0.5 | 20–100 | $10^4$ | Comparative |
| $b_2$ | Powder obtained by milling $a_2$ to lessen the fiber size | 0.05–0.1 | 1–10 | $10^0$ | Example |
| $b_3$ | Acetylene black (carbon black material, by Denki Chem. Co., Ltd.) | — | — | $10^0$ | |
| $b_4$ | Ni flakes (by Bannete Co., Ltd.) | — | — | $10^{-3}$ | |
| $b_5$ | Brass fibers (by Bekalt Co., Ltd.) | 20–50 | 20–200 | $10^{-3}$ | |
| $b_6$ | Soft ferrite (by Toda Ind. Co., Ltd.) | — | — | $>10^{10}$ | |

*Tismo D, Ohtsuka Chem. Co., Ltd.
**The reduction process was carried out by adding carbon fiber to potassium titanate and then heat treating them at 500 to 1300° C. under an inert gas atomosphere.

TABLE 2

| | | Example | | | | | | | | | Comparative example | | | | | |
|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 |
| Wave absorbent | Kind | $a_1$ | $a_2$ | $a_2$ | $a_2$ | $a_2$ | $a_2$ | $a_3$ | $a_4$ | $a_5$ | $b_1$ | $b_2$ | $b_3$ | $b_4$ | $b_5$ | $b_6$ |
| | Amount (parts by weight) | 200 | 50 | 70 | 100 | 150 | 200 | 60 | 100 | 150 | 200 | 100 | 80 | 100 | 100 | 150 |
| Amount of vinyl chloride resin (parts by weight) | | ← 100 → | | | | | | | | | | | | | | |
| Film thickness ($\mu$m) | | 400 | 200 | 100 | 70 | 50 | 30 | 50 | 50 | 150 | 300 | 100 | 300 | 50 | 50 | 70 |
| 8 GHz | Tr** (%) | 57 | 55 | 45 | 36 | 39 | 48 | 42 | 40 | 56 | 96 | 83 | 98 | 8 | 6 | 89 |
| | Rf** (%) | 8 | 9 | 13 | 12 | 12 | 9 | 11 | 13 | 7 | 3 | 14 | 1 | 71 | 70 | 10 |
| | Abs** (%) | 35 | 36 | 42 | 52 | 49 | 43 | 47 | 47 | 47 | 1 | 3 | 1 | 21 | 24 | 1 |
| 10 GHz | Tr (%) | 60 | 58 | 47 | 39 | 40 | 51 | 43 | 42 | 60 | 95 | 82 | 96 | 6 | 6 | 87 |
| | Rf (%) | 5 | 7 | 10 | 10 | 11 | 8 | 11 | 12 | 5 | 3 | 12 | 2 | 70 | 68 | 11 |
| | Abs (%) | 35 | 35 | 43 | 51 | 49 | 41 | 46 | 46 | 35 | 2 | 6 | 2 | 24 | 27 | 2 |
| 12 GHz | Tr (%) | 64 | 60 | 51 | 45 | 42 | 53 | 45 | 45 | 66 | 95 | 79 | 96 | 5 | 7 | 83 |
| | Rf (%) | 6 | 8 | 10 | 11 | 13 | 9 | 14 | 13 | 5 | 2 | 13 | 2 | 68 | 65 | 11 |
| | Abs (%) | 30 | 32 | 39 | 44 | 45 | 38 | 41 | 42 | 29 | 3 | 8 | 2 | 27 | 28 | 6 |
| 14 GHz | Tr (%) | 65 | 62 | 53 | 47 | 43 | 54 | 48 | 46 | 67 | 94 | 78 | 97 | 4 | 7 | 81 |
| | Rf (%) | 6 | 8 | 9 | 10 | 10 | 7 | 12 | 11 | 4 | 2 | 11 | 1 | 67 | 64 | 11 |
| | Abs (%) | 29 | 30 | 38 | 43 | 47 | 39 | 40 | 43 | 29 | 4 | 11 | 2 | 29 | 29 | 18 |

**Tr means a wave transmission factor, Rf means a wave reflectivity, and Abs. means a wave absorptivity.

From the results of Table 2, the wave absorber sheets made according to the method of the invention within a scope of the invention can efficiently absorb the wave having a frequency of from 8 GHz to 14 GHz with the wave reflectivity being low at about 10%. When compared with the absorber sheets of the Examples 1 to 9, the wave absorber sheet of Comparative Example 1 which made use of a wave absorbent whose volume resistivity was $10^4$ in excess of $10^2$ and the absorber sheet of Comparative Example 2 in which the fiber diameter and the aspect ratio were outside the range of the invention have, respectively, a low wave absorptivity. Of the wave absorber sheets of the other Comparative Examples in which wave absorbents other than the conductive ceramic short fibers of the invention were used, the wave absorber sheets of Comparative Examples 4 and 5 in which the metallic fibers such as Ni flakes and brass fibers, respectively, exhibit almost the same wave absorptivity as the sheets of the Examples at a frequency of 14 GHz. However, at frequencies not higher than 12 GHz, the wave absorptivity is lower than in the case of the sheets of the Examples. In addition, the wave absorber sheets of Comparative Examples 4 and 5 have a wave reflectivity not less than 60% at frequencies of 8 to 14 GHz. On the other hand, with the wave absorber sheets of Comparative Examples 3 and 6 in which conductive carbon and soft ferrite other than the conductive ceramic short fibers and the metallic fibers are used, they have both a poor wave absorptivity not larger than 8%. Thus, the excellence of the invention was confirmed from the results of the Examples when compared with those of the Comparative Examples.

The wave absorber sheets of Comparative Examples 4 and 5 using the metallic fibers have a specific gravity of 2.0 to 2.2 and the wave absorber sheet of Comparative Example 6 using soft ferrite has a specific gravity of 3.5.

On the other hand, the wave absorber sheets of the Examples have all a specific gravity below 1.5. Thus, the absorber sheets of the invention are advantageously all light in weight.

EXAMPLES 10–13

The $a_2$ in Table 1 was used as a wave absorbent and an ether-type urethane resin (by Sumitomo Bayer Co., Ltd.) was used as a polymer material, the amounts being indicated in Table 3. Thereafter, the general procedure of the foregoing Examples was repeated, thereby obtaining wave absorber sheets having sheet thicknesses indicated in Table 3.

Some of these wave absorber sheets were used in Example 10. The other sheets were overcoated with a pigment-added urethane resin in a thickness of 3 micrometers and bonded with nylon and glass fiber woven fabrics through adhesives to obtain wave absorber composite sheets of Examples 11 to 13.

The thus obtained absorber sheets of Examples 10 to 13 were subjected to measurement of wave characteristics and mechanical strengths (tensile strength and tear strength).

The test results are also shown in Table 3.

The results of Table 3 reveal that the wave absorber sheets of Examples 10 to 13 have similar wave characteristics to those of the single layer sheet of Example 10 and exhibit a good wave absorptivity in a frequency range of from 8 to 14 GHz. On the other hand, the wave absorber sheet of Example 11 has a colored appearance by application of the overcoating layer and is thus improved over the single layer sheet of Example 10. The wave absorber sheets of Examples 12 and 13 have greatly better mechanical strengths with respect to tensile and tear strengths.

Thus, the wave absorber sheet does not deteriorate and exhibit good wave absorbing properties even when laminated by the overcoating or bonding treatment.

TABLE 3

| | | Example | | | |
|---|---|---|---|---|---|
| | | 10 | 11 | 12 | 13 |
| Amount of $a_2$ (parts by weight) | | ← 100 → | | | |
| Amount of urethane resin (parts by weight) | | ← 100 → | | | |
| Film thickness (μm) | | ← 70 → | | | |
| Type of film | | Single layer | 30 μm thick overcoating of pigment-added urethane resin | Laminate with nylon woven fabric | Laminate with glass fiber woven fabric |
| 8 GHz | Tr (%) | 37 | 38 | 38 | 40 |
| | Rf (%) | 12 | 12 | 11 | 11 |
| | Abs. (%) | 51 | 50 | 51 | 49 |
| 10 GHz | Tr (%) | 40 | 41 | 40 | 41 |
| | Rf (%) | 11 | 11 | 12 | 12 |
| | Abs. (%) | 49 | 48 | 48 | 47 |
| 12 GHz | Tr (%) | 45 | 44 | 44 | 44 |
| | Rf (%) | 12 | 12 | 13 | 12 |
| | Abs. (%) | 43 | 44 | 43 | 44 |
| 14 GHz | Tr (%) | 46 | 46 | 45 | 45 |
| | Rf (%) | 10 | 11 | 11 | 11 |
| | Abs. (%) | 44 | 43 | 44 | 44 |
| Tensile strength (kg/cm$^2$) | | 210 | 250 | 500 | 900 |
| Tear strength (kg/cm) | | 55 | 70 | 220 | 450 |

What is claimed is:

1. A radio wave absorber comprising 100 parts by weight of a polymerc material and 30 to 300 parts by weight of semiconductor ceramic short fibers having a diameter of from 0.1 to 100 micrometers, an aspect ratio of from 10 to 100 and a volume resistivity of from $10^{-2}$ to $10^2$ ohms/cm, said semiconductive ceramic short fibers being dispersed uniformly in a horizontally-oriented state in said polymeric material, and said semiconductive ceramic short fibers being alkali titanate short fibers being subjected to surface conductor treatment.

2. A wave absorber according to claim 1, wherein said short fibers have a diameter of from 0.1 to 10 micrometers, an aspect ratio of from 10 to 300 and a volume resistivity of 0.5 to 20 ohms.cm.

3. A wave absorber according to claim 1, wherein said an alkali titanate has the following general formula, $M_2O(TiO_2)_n$, in which M represents an alkali metal and n is an integer of from 2to 12.

4. A wave absorber according to claim 3, wherein said alkali titanate is potassium titanate.

5. A wave absorber according to claim 1, wherein said polymer material is a film-forming polymer material selected from the group consisting of natural rubber, synthetic rubbers, polyolefin resins, alkyd resins, acrylic resins, vinyl resins, epoxy resins, urethane resins, polyamide resins, polyester resins and mixtures thereof, and said absorber is formed in the form of said a sheet.

6. A wave absorber according to claim 5, wherein a layer of a film-forming polymer material which is free of semiconductive ceramic short fibers is formed on at least a side of the absorbent sheet.

7. A wave absorber according to claim 5, wherein a woven or non-woven fabric of organic or inorganic fibers is laminated on at least a side of the absorbent sheet.

8. A wave absorber according to claim 5, wherein the semiconductive ceramic short fibers are oriented along the plane of the absorber sheet.

9. A wave absorber according to claim 5, wherein the absorber sheet has a thickness of from 10 to 500 micrometers.

* * * * *